United States Patent
El-Zohry et al.

(10) Patent No.: US 12,398,271 B1
(45) Date of Patent: Aug. 26, 2025

(54) WHITE LIGHT-EMITTING ASPHALTENE-BASED COMPOSITES FOR SELF-ILLUMINATING PAVEMENTS

(71) Applicant: KING FAHD UNIVERSITY OF PETROLEUM AND MINERALS, Dhahran (SA)

(72) Inventors: Ahmed El-Zohry, Dhahran (SA); Theis Solling, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 18/677,384

(22) Filed: May 29, 2024

(51) Int. Cl.
*C08K 3/11* (2018.01)
*C08K 3/105* (2018.01)
(Continued)

(52) U.S. Cl.
CPC ............ *C08L 95/005* (2013.01); *C08K 3/105* (2018.01); *C08K 3/11* (2018.01); *C08K 3/30* (2013.01);
(Continued)

(58) Field of Classification Search
CPC ....... C08L 95/005; C08L 35/02; C08K 3/105; C08K 3/11; C08K 3/30; C09K 11/565;
(Continued)

(56) References Cited

U.S. PATENT DOCUMENTS

| | | | |
|---|---|---|---|
| 5,213,711 A * | 5/1993 | Fast | C09K 11/02 252/301.36 |
| 8,609,752 B2 * | 12/2013 | Bowen, III | C08G 18/10 524/64 |

(Continued)

FOREIGN PATENT DOCUMENTS

| | | |
|---|---|---|
| CN | 113480940 B | 3/2022 |
| EP | 3 583 266 B1 | 12/2021 |
| WO | 92/18573 | 10/1992 |

OTHER PUBLICATIONS

Autelitano et al. ; Daytime and nighttime color appearance of pigmented asphalt surface treatments ; Construction and Building Materials, vol. 207 ; May 20, 2019 ; 6 Pages.

*Primary Examiner* — Michael P Wieczorek
(74) *Attorney, Agent, or Firm* — Oblon, McClelland, Maier & Neustadt, L.L.P.

(57) ABSTRACT

A method of illuminating a pavement including mixing asphaltenes and a polymer in a solvent to form a solution. The method further includes coating the pavement with the solution and evaporating the solvent to form a coated pavement, followed by irradiating the coated pavement. Following the irradiation, the asphaltenes emit light, thereby illuminating the pavement. The asphaltenes are homogeneously dispersed in a polymer matrix in the coated pavement. The polymer has a formula (I) as follows, $$\left[ \begin{array}{c} R_1 \\ | \\ O=C-O \\ | \\ H_2C-C \\ | \\ R_2 \end{array} \right]_n \quad (I)$$

$R_1$ and $R_2$ are each independently an optionally substituted alkyl group with 1 to 20 carbon atoms or an optionally substituted aryl group with 1 to 20 carbon atoms, and n is 2 to 10000.

20 Claims, 9 Drawing Sheets

(51) Int. Cl.
     *C08K 3/30*    (2006.01)
     *C08L 35/02*   (2006.01)
     *C08L 95/00*   (2006.01)
     *C09K 11/56*   (2006.01)
     *C09K 11/61*   (2006.01)
     *C09K 11/88*   (2006.01)
(52) U.S. Cl.
     CPC ............ *C08L 35/02* (2013.01); *C09K 11/565* (2013.01); *C09K 11/615* (2013.01); *C09K 11/616* (2013.01); *C09K 11/883* (2013.01); *C08K 2003/3036* (2013.01)
(58) Field of Classification Search
     CPC ... C09K 11/615; C09K 11/616; C09K 11/883; C09K 11/00; C04B 41/0018; C04B 41/00; E01C 11/00; E01C 11/165; E01C 11/005; E01C 11/16; E01C 11/18; C09D 5/22; C09D 195/00; C09D 195/005
     See application file for complete search history.

(56) References Cited

U.S. PATENT DOCUMENTS

2010/0179245 A1\* 7/2010 Guzman .............. C09D 195/00
                                             524/60
2015/0197636 A1\* 7/2015 Siddiqui ................ C08L 33/12
                                             524/705

\* cited by examiner

Excitation 365 nm

Excitation 266 nm

No emission under UV

WHITE LIGHT-EMITTING ASPHALTENE-BASED COMPOSITES FOR SELF-ILLUMINATING PAVEMENTS

CROSS REFERENCE TO RELATED APPLICATION

The present disclosure claims the benefit of Saudi Patent Application No. 1020242421 filed on May 7, 2024, with the Saudi Authority for Intellectual Property Office, which is incorporated herein by reference in its entirety.

STATEMENT OF ACKNOWLEDGEMENT

Support provided by the King Fahd University of Petroleum and Minerals (KFUPM) is gratefully acknowledged.

BACKGROUND

Technical Field

The present disclosure is directed towards a composite for self-illuminating pavements, particularly towards a white light-emitting asphaltene-based composite for self-illuminating pavements.

Description of Related Art

The "background" description provided herein presents the context of the disclosure generally. The work of the presently named inventors, to the extent it is described in this background section, as well as aspects of the description that may not otherwise qualify as prior art at the time of filing, are neither expressly nor impliedly admitted as prior art against the present invention.

Asphaltene is a heavy and abundant product of the crude oil industry. It is a main natural surfactant in crude oil that enables emulsification and demulsification processes. Asphaltene, or a vacuum residue of asphaltene, is mainly utilized to pave roads and highways. Asphaltene is obtained from crude oil, bitumen, or coal through separation with petroleum naphtha, n-pentane, and n-heptane. Asphaltenes are defined by solubility characteristics rather than chemical structures and include elements such as carbon, hydrogen, nitrogen, oxygen, sulfur, vanadium and nickel.

Many of the structures which make up asphaltenes include conjugated double bonds, such as single or multiple aromatic rings. These conjugated double bond structures result in unique optical properties such as, but not limited to, absorption of ultraviolet (UV) and visible light wavelengths, along with emission of visible light. In particular, asphaltenes absorb UV light and emit a wide range of visible light that may cover the entire visible spectrum, producing a white color emission. Asphaltene was previously considered a component that may be added to other materials to provide a fluorescent, safe, white light. However, traditionally, asphaltene is added as a base layer rather than as an emissive material in road pavements.

As asphaltene is used a binder component of asphalt, a dense aggregated structure is formed from the components of the asphaltene. As the number of conjugated bonds and aromatic rings increases, aggregation through pi stacking may also increase. Pi stacking refers to the attractive, noncovalent pi interactions (orbital overlap) between the pi bonds of aromatic rings. In addition, other attractive forces can result in aggregation of the asphaltenes, such as dipole-dipole interactions, hydrogen bonding, and London dispersion forces. However, these attractive forces may lead to a phenomenon called aggregation caused quenching (ACQ) which greatly impedes their optical applications. Overall, the reduced emission of the asphaltenes in an aggregated state prevents the light emission in road pavement applications. Therefore, there exists a need to provide an asphaltene which will emit white light and illuminate a plurality of pavements.

Hence, efficient methods must be developed that may substantially reduce or eliminate the above limitations. Accordingly, an object of the present disclosure is to develop a white light-emitting asphaltene-based composite for self-illuminating pavements. The composite of the present disclosure overcomes the drawbacks of traditional methods, such as limited visible wavelength emission.

SUMMARY

In an exemplary embodiment, a method of illuminating a pavement is described. The method includes mixing asphaltenes and a polymer in a solvent to form a solution. The method further includes coating the pavement with the solution and evaporating the solvent to form a coated pavement. Furthermore, the method includes irradiating the coated pavement, upon which the asphaltenes emit light, thereby illuminating the pavement. The asphaltenes are homogeneously dispersed in a matrix of the polymer in the coated pavement. The polymer has a formula (I) as follows, where $R_1$ and $R_2$ are each independently an optionally substituted alkyl group having 1 to 20 carbon atoms, or an optionally substituted aryl group having 1 to 20 carbon atoms, and n is 2 to 10,000.

In some embodiments, the asphaltenes include carbon, hydrogen, nitrogen, oxygen, sulfur, vanadium and nickel.

In some embodiments, the asphaltenes are not aggregated in the coated pavement.

In some embodiments, the asphaltenes are sourced from crude oil, bitumen, or coal.

In some embodiments, the asphaltenes have a molecular weight of 200 grams per mole (g/mol) to 2000 g/mol.

In some embodiments, the asphaltenes have a concentration of 1 nanograms per milliliter (ng/mL) to 1000 ng/ml in the solution.

In some embodiments, the method further includes dissolving the asphaltenes in toluene prior to the mixing.

In some embodiments, the method further includes halogenating the asphaltenes with at least one of chlorine, bromine, and iodine prior to the mixing.

In some embodiments, the solvent is at least one of tetrahydrofuran, toluene, cyclohexanone, ethyl acetate, dichloromethane, and chloroform.

In some embodiments, the asphaltenes emit white light having a wavelength of 400 nanometers (nm) to 800 nm.

In some embodiments, the polymer is polymethyl methacrylate (PMMA).

In some embodiments, the polymer has a molecular weight of 100 to 200,000 g/mol.

In some embodiments, at least one of $R_1$ and $R_2$ in the polymer comprises an optionally substituted naphthalene.

In some embodiments, the naphthalene is substituted with at least one of a hydroxyl and a halide.

In some embodiments, the method includes irradiating the coated pavement with at least one source selected from vehicle headlights, streetlights, and sunlight.

In some embodiments, the method includes irradiating the coated pavement with light having a wavelength of 310 to 390 nm.

In some embodiments, the solution further includes at least one additive selected from water, sodium dodecyl sulphate, CuBr, NaI, $CuSO_4$, $GaCl_3$, LiCl, CsF, $FeCl_3$, $CaCl_2$, $K_2SO_4$, NaCl, cetyltrimethylammonium bromide, $ZnCl_2$, $Cr_2(NO_3)_2$, NiI, and CdSe/ZnS quantum dots.

In some embodiments, the solution further comprises at least one additive selected from $CaCl_2$), NiI, and CdSe/ZnS quantum dots.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

The term "halo" or "halogen" includes fluoro, chloro, bromo and iodo.

The term "aryl" means a carbocyclic aromatic monocyclic group containing 6 carbon atoms which may be further fused to a second 5- or 6-membered carbocyclic group which may be aromatic, saturated or unsaturated. Aryl includes, but is not limited to, phenyl, anthracenyl, indanyl, 1-naphthyl, 2-naphthyl, and tetrahydronaphthyl. The fused aryls may be connected to another group either at a suitable position on the cycloalkyl/cycloalkenyl ring or the aromatic ring.

As used herein, the term "alkyl" unless otherwise specified refers to both branched and straight chain aliphatic (non-aromatic) hydrocarbons which may be primary, secondary, and/or tertiary hydrocarbons typically having 1 to 32 carbon atoms (e.g., $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, etc.) and specifically includes, but is not limited to, saturated alkyl groups such as methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, tetradecyl, pentadecyl, hexadecyl, heptadecyl, octadecyl, nonadecyl, eicosyl, guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octylodecyl, 2-nonyltridecyl, 2-decyltetradecyl, and 2-undecylpentadecyl), as well as unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like.

As used herein, the term "substituted" refers to at least one hydrogen atom that is replaced with a non-hydrogen group, provided that normal valencies are maintained and that the substitution results in a stable compound. When a substituent is noted as "optionally substituted", the substituent(s) are selected from alkyl, halo (e.g., chloro, bromo, iodo, fluoro), hydroxyl, alkoxy, oxo, alkanoyl, aryloxy, alkanoyloxy, amino (—NH$_2$), alkylamino (—NHalkyl), cycloalkylamino (—NHcycloalkyl), arylamino (—NHaryl), arylalkylamino (—NHarylalkyl), disubstituted amino (e.g., in which the two amino substituents are selected from alkyl, aryl or arylalkyl, including substituted variants thereof, with specific mention being made to dimethylamino), alkanoylamino, aroylamino, arylalkanoylamino, thiol, alkylthio, arylthio, arylalkylthio, alkylthiono, arylthiono, arylalkylthiono, alkylsulfonyl, arylsulfonyl, arylalkylsulfonyl, sulfonamide (e.g., —SO$_2$NH$_2$), substituted sulfonamide (e.g., —SO$_2$NHalkyl, —SO$_2$NHaryl, —SO$_2$NHarylalkyl, or cases where there are two substituents on one nitrogen selected from alkyl, aryl, or alkylalkyl), nitro, cyano, carboxy, unsubstituted amide (i.e. —CONH$_2$), substituted amide (e.g., —CONHalkyl, —CONHaryl, —CONHarylalkyl or cases where there are two substituents on one nitrogen selected from alkyl, aryl, or alkylalkyl), alkoxycarbonyl, aryl, guanidine, heterocyclyl (e.g., pyridyl, furyl, morpholinyl, pyrrolidinyl, piperazinyl, indolyl, imidazolyl, thienyl, thiazolyl, pyrrolidyl, pyrimidyl, piperidinyl, homopiperazinyl), and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The present disclosure is intended to include all isotopes of a given compound or formula, unless otherwise noted, and all hydration states of a given compound or formula, unless otherwise noted or when heating a material.

Aspects of the present disclosure are directed to a white light-emitting asphaltene-based composite for self-illuminating pavements. When coated on pavement, the composite is capable of self-illuminating the pavements in the dark by absorbing sunlight and/or other sources of light (for example, UV light emitted from traveling cars at night) and emitting white light, thereby saving electricity and road maintenance costs for illuminating roads.

Figure 1:
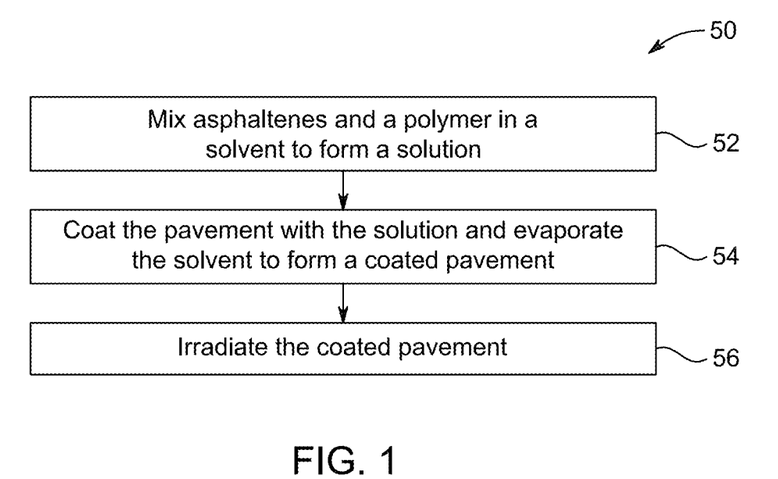
FIG. 1 is a flowchart illustrating a method illuminating a pavement, according to certain embodiments.

A method of illuminating a pavement is described. The order in which method 50 is described is not intended to be construed as a limitation, and any number of the described method steps can be combined in any order to implement method 50. Additionally, individual steps may be removed or skipped from method 50 without departing from the spirit and scope of the present disclosure.

At step 102, the method 100 includes mixing asphaltenes and a polymer in a solvent to form a solution. Asphaltenes are complex molecular mixtures or components found in crude oil, bitumen, or coal, preferably crude oil, insoluble in n-heptane and soluble in toluene. In a preferred embodiment, the asphaltenes are a waste product from an oil refinery, and therefore, the present method is a method of recycling and reducing waste. In a preferred embodiment, the asphaltenes are extracted from crude oil.

Asphaltenes are mainly composed of polyaromatic carbon rings, including heteroatoms of oxygen, nitrogen, and sulfur, as well as trace amounts of metals, such as vanadium and nickel. In some embodiments, the asphaltenes includes less than 5 wt. % of the vanadium or nickel, preferably less than 4 wt. %, 3 wt. %, 2 wt. %, 1 wt. % or 0.1 wt. %. Asphaltenes are colloidal dispersions in crude oil amounting to mass fractions between 0% and 10%, and sometimes more. In some embodiments, a mixture of asphaltenes obtained from different sources may be used as well.

In some embodiments, the asphaltenes have an average molecular weight of 100-2000 grams per mole (g/mol), preferably 200-1900 g/mol, preferably 300-1800 g/mol, preferably 400-1700 g/mol, preferably 500-1600 g/mol, preferably 600-1500 g/mol, preferably 700-1400 g/mol, preferably 800-1300 g/mol, preferably 900-1200 g/mol or preferably 1000-1100 g/mol. The C:H ratio is approximately 1-10 to 1-10, preferably 1:1, 1:2, 1:3, 1:4, 1:5, 1:6, 1:7, 1:8, 1:9, and 1:10 depending on the asphaltene source. In some embodiments, when dissolved in a solution, the asphaltenes emit white light having a wavelength of 400 nanometers (nm) to 800 nm, preferably 450-750 nm, 500-700 nm, 550-650 nm, or about 600 nm.

In some embodiments, prior to the mixing the asphaltenes are oxidized. Oxidation of the asphaltenes produces functional groups such as hydroxide or alcohol groups, carboxyl groups, and epoxide groups. In a preferred embodiment, oxidation produces alcohol groups on a surface of the asphaltenes. In some embodiments, the oxidation is performed by any method known in the art such as but not limited to heating with an acid such as sulfuric acid in the presence of an oxidant such as potassium permanganate.

In some embodiments, a surface of the asphaltene compounds includes hydroxide, carboxyl, and epoxide groups. In some embodiments, at least one of the hydroxide, carboxyl, and epoxide groups can be reacted and functionalized with additional elements or carbon groups to improve the dispersibility. In some embodiments, the functionalization includes reacting with a halogenation agent, such as but not limited to phosphorus tribromide (PBr$_3$) and thionyl chloride (SOCl$_2$). In such an embodiment, at least a portion of the carboxyl groups are converted to an acyl chloride or bromide group. In some embodiments, the method further includes halogenating the asphaltenes with at least one of chlorine, bromine, and iodine prior to the mixing.

In some embodiments, the acyl chloride or bromide group is maintained in the asphaltene or is subjected to an additional reaction. In some embodiments, the additional reaction includes reacting the acyl halide group with an alcohol to form an ester group (asphaltene-C($=$O)—O—R$^1$) or reacting the acyl halide group with an amine to form an amide group (asphaltenes-C($=$O)—NR$^1$R$^2$), where R$^1$ and R$^2$ are the same or different and are selected from an optionally substituted alkyl or aryl group having 1-20 carbons, preferably 2-19 carbons, preferably 3-18 carbons, preferably 4-17 carbons, preferably 5-16 carbons, preferably 6-15 carbons, preferably 7-14 carbons, preferably 8-13 carbons, preferably 9-12 carbons, or preferably 10-11 carbons. In some embodiments, the functionality of the asphaltenes is changed based on the source of the asphaltenes.

In some embodiments, to prevent self-aggregation of the asphaltenes, the asphaltenes are mixed with a polymer of formula (I), where $R_1$ and $R_2$ are each independently an optionally substituted alkyl group having 1-20 carbon atoms, preferably 1-15 carbon atoms, preferably 1-10 carbon atoms, preferably 1-8 carbon atoms, preferably 1-5 carbon atoms, preferably 1-3 carbon atoms, preferably 1 carbon atom/ methyl group. In some embodiments, the $R_1$ and $R_2$ may be optionally substituted aryl groups having 1-20 carbon atoms, preferably 1-18 carbon atoms, preferably 1-15 carbon atoms, preferably 1-12 carbon atoms, preferably 1-10 carbon atoms, each of which may be optionally substituted. In the compound of Formula (I) n is 2-10,000, preferably 50-9,000, 100-8,000, 200-7,000, 300-6,000, 400-5,000, 500-4,000, 600-3,000, 700-2,000, or 800-1,000. In a preferred embodiment, the polymer has a weight average molecular weight of 100-200,000 g/mol, preferably 200-150,000 g/mol, preferably 5,000-100,000 g/mol, 10,000-80,000 g/mol, 15,000-50,000 g/mol, or 30,000-40,000 g/mol.

In some embodiments, the polymer is polymethyl methacrylate (PMMA) having the following formula (II):

In some embodiments, at least one of $R_1$ and $R_2$ in the polymer includes an optionally substituted naphthalene having the following structure (III):

where the naphthalene is substituted at the 1 ($R_3$) and/or 2 ($R_4$) position. In some embodiments, the naphthalene is unsubstituted and is present at only one of the $R_1$ and $R_2$ positions in formula (I).

In some embodiments, the naphthalene is substituted with at least one of a hydroxyl and a halide. The halide may be Cl, Br, or I. In some embodiments, 1 or 2 positions of $R_3$ and $R_4$ are substituted with a hydroxyl or a halide. In some embodiments, one $R_3$ position is a hydroxyl group. The addition of the naphthalene into the polymer improves the interaction between the aromatic compounds present in the asphaltene and the polymer, thereby producing a more dispersed system. Further, the incorporation of a halide or a hydroxyl group can improve compatibility of the polymer with components in the asphaltene, for example by hydrogen bonding with the hydroxyl group. The naphthalene may also broaden the range of light that is absorbed by the asphaltenes. The naphthalene may be replaced or included with other compounds that broaden the light absorption properties, such as but not limited to anthracene, tetracene, pentacene, and pyrene.

In an alternative embodiment, the $R_1$ and $R_2$ in the polymer include an extended alkyl chain having 10-20 carbon atoms, preferably 12-18, or 14-16 carbon atoms. The extended alkyl chain can improve compatibility of the polymer with components in the asphaltene. In addition, the $R_1$ and $R_2$ in the polymer include a polyethylene glycol having 10-20 carbon atoms, preferably 12-18, or 14-16 carbon atoms. The polar groups of the polyethylene glycol can improve compatibility of the polymer with components in the asphaltene. In a most preferred embodiment, the asphaltenes are homogeneously dispersed in a matrix of the polymer in the coated pavement.

In a most preferred embodiment, the $R_1$ in the polymer is a halide, selected from chlorine, bromine, and iodine, preferably chlorine, thereby creating an acid halide functional group on the polymer. In some embodiments, when mixed with asphaltenes which have undergone oxidation as previously described, the —OH groups present in the asphaltenes can react with the acid halide to form an ester linkage (RCOOR). The ester linkage thereby creates a covalent bond between the asphaltene and the polymer. This also ensures that one asphaltene is bound to each unit of the polymer, thereby preventing aggregation of the asphaltene. One of ordinary skill in the art would recognize the conditions needed to react an alcohol with an acid halide to form an ester, such as but not limited to in a presence of a base selected from triethylamine, sodium hydroxide, or potassium hydroxide.

In some embodiments, the solution may further include one or more additives. In a preferred embodiment, the additive changes the absorption and/or emission properties of the asphaltene. The additive may also help in dispersing the asphaltenes in a solvent, such as a surfactant. In some embodiments, the additive improves the drying properties of the solution on the pavement and prevents aggregation, such as a salt.

The additive may be one or more of water, sodium dodecyl sulfate, CuBr, NaI, $CuSO_4$, $GaCl_3$, LiCl, CsF, $FeCl_3$, $CaCl_2$), $K_2SO_4$, NaCl, cetyltrimethylammonium bromide, $ZnCl_2$, $Cr_2(NO_3)_2$, NiI, and CdSe/ZnS quantum dots. In a preferred embodiment, the additive is one or more selected from $CaCl_2$), NiI, and CdSe/ZnS quantum dots. The concentration of the additives can be in the range of 0.1-2 M, preferably 0.5-2 M, preferably 0.6-1.5 M, preferably 0.7-1.4 M, preferably 0.8-1.3 M, preferably 0.9-1.2 M, preferably 1 M.

In some embodiments, the CdSe/ZnS quantum dots may exist various morphological shapes, such as rods, spheres, wires, crystals, rectangles, triangles, pentagons, hexagons, prisms, disks, cubes, ribbons, blocks, beads, toroids, discs, barrels, granules, whiskers, flakes, foils, powders, boxes, stars, tetrapods, belts, flowers, etc. and mixtures thereof. In a preferred embodiment, the CdSe/ZnS quantum dots are spherical and have an average diameter of 1-30 nm, preferably 2-29 nm, 3-28 nm, 4-27 nm, 5-26 nm, 6-25 nm, 7-24 nm, 8-23 nm, 9-22 nm, 10-21 nm, 11-20 nm, 12-19 nm, 13-18 nm, 14-17 nm, or 15-16 nm. In an embodiment, the addition of the CdSe/ZnS quantum dots increases emission of the asphaltenes from 600-700 nm, 610-690 nm, 620-680 nm, 630-670 nm, 640-660 nm, or about 650 nm.

In some embodiments, the method includes dissolving the asphaltenes in a solvent prior to mixing the asphaltenes with the polymer. The solvent could be mixed with the polymer and asphaltene simultaneously, or it could be mixed with only one of the two, followed by the addition of the other of the two. In a preferred embodiment, the asphaltenes are dissolved in a suitable solvent prior to the addition of the polymer to form an asphaltene solution. The purpose of dispersion/dissolution of the asphaltenes in a suitable solvent is to homogeneously disperse the asphaltene and prevent the aggregation of the asphaltene particles. In a preferred embodiment, the solvent and the polymer are dissolved in separate solutions before mixing together, where the solvents for dissolving each may be the same or different.

Suitable examples of the solvents include, but are not limited to, acetic acid, acetic acid anhydride, acetone, acetonitrile, benzene, iso-butanol, n-butanol, tert-butanol, carbon tetrachloride, chlorobenzene, chloroform, cyclohexane, cyclopentane, dichloromethane, dioxane, ethanol, ethyl acetate, ethylene dichloride, heptane, n-hexane, hydrochloric acid, methyl ethyl ketone, methanol, methyl tert-butyl ether, iso-propanol, n-propanol, pyridine, tetrahydrofuran, toluene, trifluoroacetic acid, water, dimethyl acetamide, dimethyl formamide, pentane, diethyl ether, dimethyl sulfoxide, ethyl ether, ethylene glycol, petroleum ether, and mixtures thereof. In some embodiments, the solvent is at least one of tetrahydrofuran, toluene, cyclohexanone, ethyl acetate, dichloromethane, and chloroform. In a preferred embodiment, the solvent is toluene.

In some embodiments, the polymer is dissolved in a suitable solvent prior to adding to polymer to the asphaltene solution. The solvent may be acetic acid anhydride, acetone, acetonitrile, benzene, iso-butanol, n-butanol, tert-butanol, carbon tetrachloride, chlorobenzene, chloroform, cyclohexane, cyclopentane, dichloromethane, dioxane, ethanol, ethyl acetate, ethylene dichloride, heptane, n-hexane, hydrochloric acid, methyl ethyl ketone, methanol, methyl tert-butyl ether, iso-propanol, n-propanol, pyridine, tetrahydrofuran, toluene, trifluoroacetic acid, water, dimethyl acetamide, dimethyl formamide, pentane, diethyl ether, dimethyl sulfoxide, ethyl ether, ethylene glycol, petroleum ether, and mixtures thereof. In some embodiments, the solvent is chloroform.

In some embodiments, the asphaltenes are present in the solution at a concentration of 1-1,000 ng/ml, preferably 10-1000 ng/ml, preferably 50-1000 ng/ml, preferably 100 ng/mL, preferably 200-900 ng/mL, preferably 300-800 ng/ml, preferably 400-700 ng/mL, preferably 500-600 ng/mL, preferably 500 ng/mL.

In some embodiments, the asphaltenes are physically dispersed in the polymer, whereby no chemical reaction occurs between the asphaltenes and the polymer. In some embodiments, a chemical reaction occurs between the polymer and the asphaltene, as previously described.

At step 104, the method 100 includes coating the pavement with the solution and evaporating the solvent to form a coated pavement. The solution as prepared above is coated on pavement and is allowed to dry for complete evaporation of the solvent. In a preferred embodiment, the solvent is evaporated by air drying or heating. After evaporation, it can be observed that the asphaltenes are homogeneously dispersed in a polymer matrix in the coated pavement. Also, the asphaltenes are not aggregated in the coated pavement.

The pavement may be road paving, roof or ceiling paving, etc., or in civil construction mixture used for ceilings, beams, pillars, floors, roads, etc. In some embodiments, the pavement is a highway. However, in some embodiments, the pavement may be a city road, a state highway, a national highway, and the like.

In general, road construction includes the design, building, and maintenance of roads, highways, motorways, and other transportation infrastructure. In road engineering and construction, two major types of pavements are considered, rigid and flexible. When rigid pavements are constructed, a reinforced or unreinforced in-situ concrete slab is laid over the subgrade. Loads are supported by flexural strength of the pavement, which acts similar to a stiff plate, transferring the load over a wider area of subgrade. Concrete roads are a rigid road pavement type, with integrated joints in the concrete to control cracking. Further, flexible pavements have multiple layers, with road asphalt making up surface layers. With flexible pavements, wheel loads are transferred by particle-to-particle contact of an aggregate material (asphalt) through the unbound granular layers of the asphalt to the subgrade. The pavement is supported by and protects the subgrade below the pavement.

Asphalt and a crushed aggregate are chemically and physically combined together to form asphalt concrete, also referred to as tarmac. The asphalt concrete is laid over the base via specialty road construction equipment and machinery. The road construction equipment may include a road roller, a motor grader, a wheel loader, an asphalt mixing plant, a crawler excavator, and the like. The road roller is used again to further compact the asphalt concrete and form a waterproof, low maintenance, and durable paved road. The paved road may include multiple layers (defined from bottom to top, respectively), such as, but not limited to, a natural formation, subgrade, base course, surface course, and asphalt concrete.

In some embodiments, the solution is coated on an existing paved structure. In an alternative embodiment, the solution in included in the mixture as the road or other structure is paved. In some embodiment, 1-50 coats, preferably 5-45, 10-40, 15-35, or 20-30 coats of the solution are provided.

In some embodiments, the coating step forms a coated pavement comprising a top layer comprising the asphaltenes and the polymer, and a bottom layer comprising a solid stone aggregate dispersed in an asphalt matrix. Top layer is referred to as that on the outermost surface, or which a car would drive on. In some embodiments, the asphalt matrix includes asphaltene components different from the asphaltenes in the top layer. In some embodiments, the asphaltene components in the asphalt matrix are aggregated and therefore do not emit light. In some embodiments, the top layer has a thickness of less than 0.1, preferably 0.08, 0.06, 0.04 or 0.02 times the thickness of the second layer.

At step 106, the method 100 includes irradiating the coated pavement. The pavement is irradiated with a source selected from vehicle headlights, streetlights, and sunlight. In a preferred embodiment, the light source provides a wavelength of 250-450 nm, preferably 260-440 nm, 270-430 nm, 280-420 nm, 290-410 nm, 300-400 nm, 310-390 nm, 320-380 nm, 330-370 nm, 340-360 or about 350 nm. The asphaltenes may be adjusted as described earlier to account for the wavelength of light absorbed.

After irradiating the coated pavement with light having a wavelength of 310-390 nm, preferably 320-380 nm, and preferably 350-385 nm, the asphaltenes which are dispersed and non-aggregated in the polymer, emit white light having a wavelength of 400-800 nm, preferably 500-700 nm.

EXAMPLES

The following examples demonstrate a method of self-illuminating a pavement using asphaltene and a polymer. The examples are provided solely for illustration and are not to be construed as limitations of the present disclosure, as many variations thereof are possible without departing from the spirit and scope of the present disclosure.

Example 1: Synthesis of Asphaltene Sample

An asphaltene sample was extracted from crude oil and dissolved in commercial toluene solvent with sonication for 10 minutes, then diluted to 500 nanograms per milliliter (ng/ml) and irradiated by a specified ultraviolet (UV) lamp at a central wavelength of 365 nanometers (nm) to 385 nm. Broad white emission (blue, green, and red colors are mixed) was detected by the bare eye, as shown in FIG. 2C. Further, 30 ng/ml of asphaltene solution is mixed with PMMA solution in $CHCl_3$ to make thin films and various shapes. Upon adding additives, 2 milliliters (ml) of 250 ng/ml of asphaltene sample dissolved in toluene was irradiated with 350 nm wavelength light, and emission was monitored upon adding 20 microliters (µL) of high-concentration additives (1 molar).

Example 2: Absorption and Emission Properties

Figure 2A:
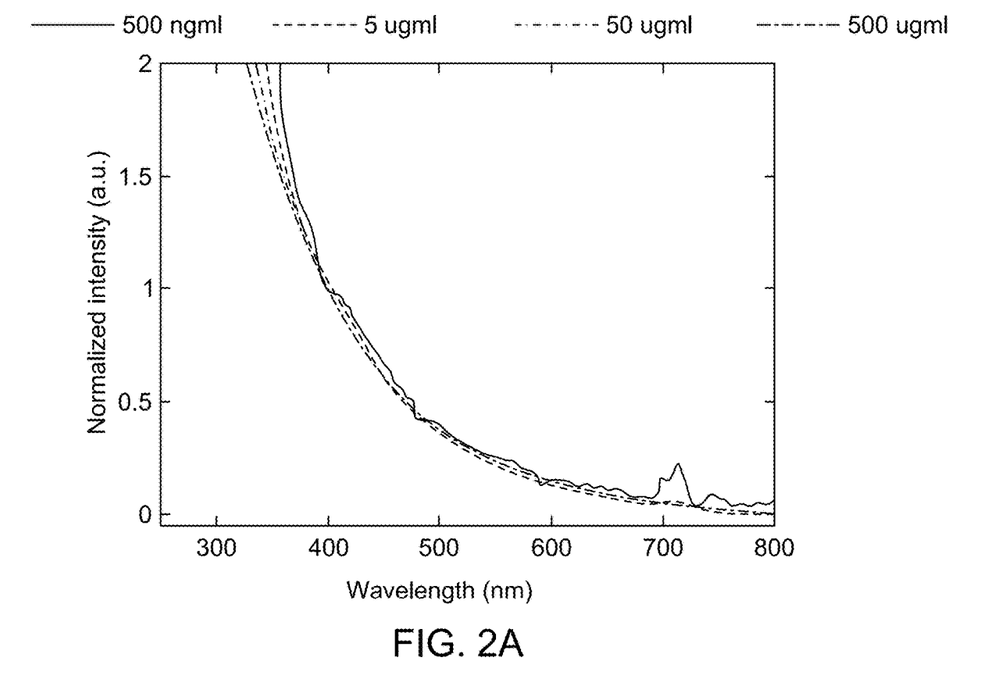
FIG. 2A shows absorption spectra for asphaltene samples at various concentrations, according to certain embodiments.
Figure 2B:
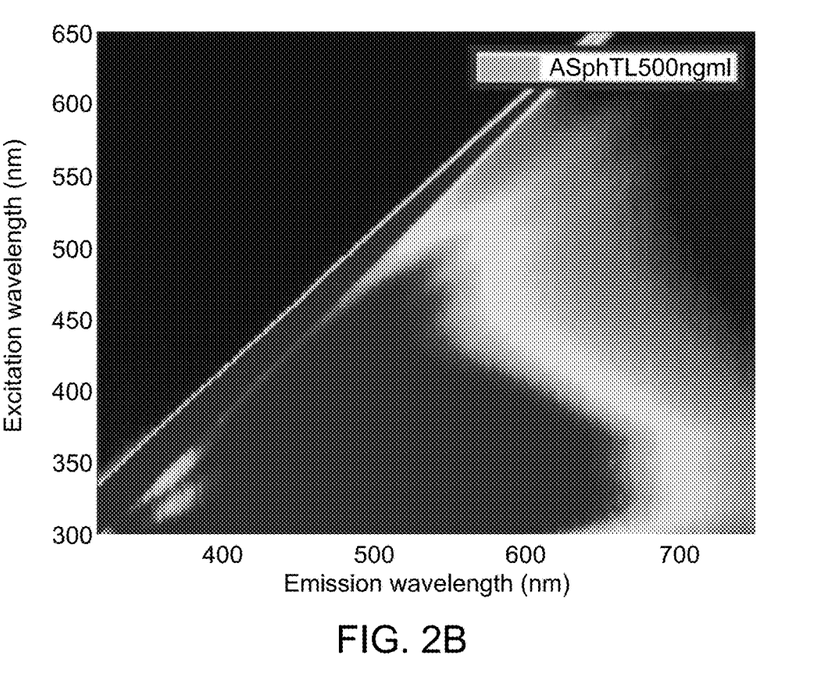
FIG. 2B is an emission map for asphaltene dissolved in toluene showing a broad emission band from 350 nanometers (nm) of wavelength to 750 nm wavelength, according to certain embodiments.
Figure 2C:
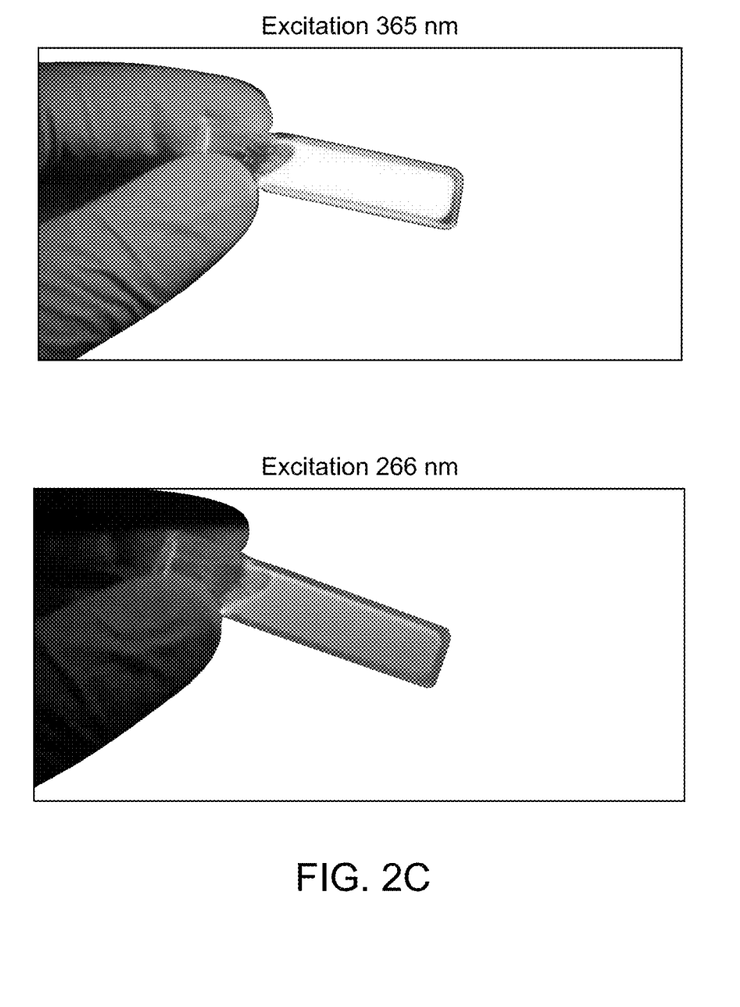
FIG. 2C are optical images showing white light emission for asphaltene samples under excitation wavelengths of 365 nm and 266 nm, according to certain embodiments.
Figure 2D:
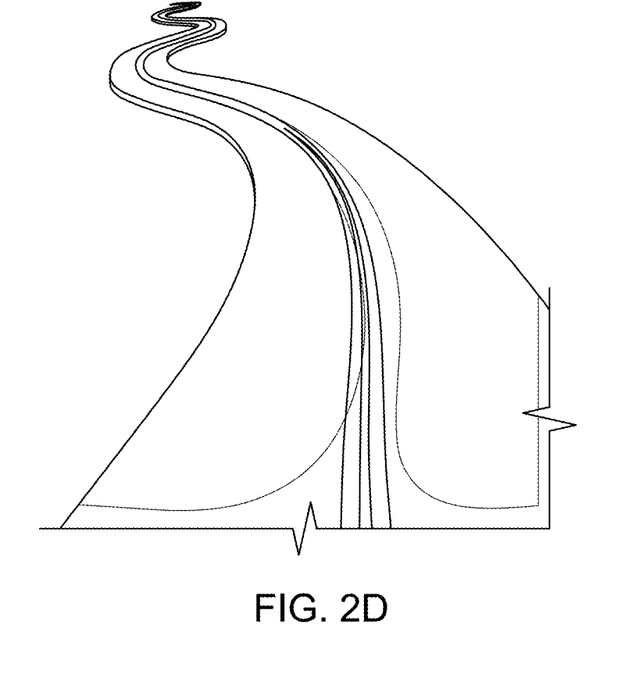
FIG. 2D shows an illuminated pavement at night via UV excitation by automobile headlights on the pavement, according to certain embodiments.

FIG. 2A shows the absorption of asphaltene sample dissolved in toluene, in which no sign of aggregation was observed. Various emissions at different energies are observed upon exciting the asphaltene with various excitation sources, including 300 nm to 550 nm wavelength (as shown in FIG. 2B). However, white light emission may be observed by selectively using near UV light (310 nm to 390 nm). Further, as can be seen from FIG. 2C, a difference may be noted between 365 nm and 266 nm excitation sources. Since asphaltene is mainly used to pave roads and highways, it may be utilized to illuminate the roads by the UV wavelengths emitted by the sun during daytime. Furthermore, as can be seen from FIG. 2D, the roads may be illuminated using asphaltene via limited UV wavelengths emitted by a car's headlight at night.

Figure 3A:
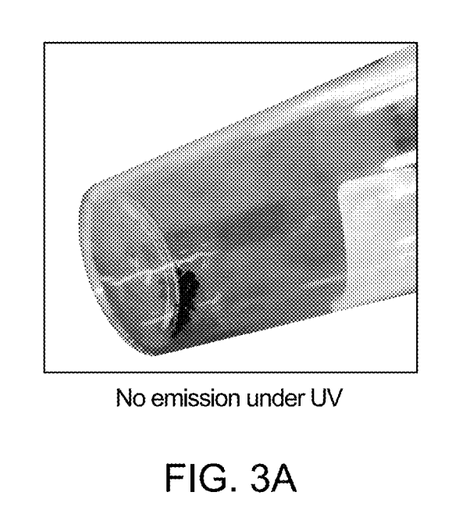
FIG. 3A is an image showing solid particles of asphaltene having no emission under UV light, according to certain embodiments.
Figure 3B:
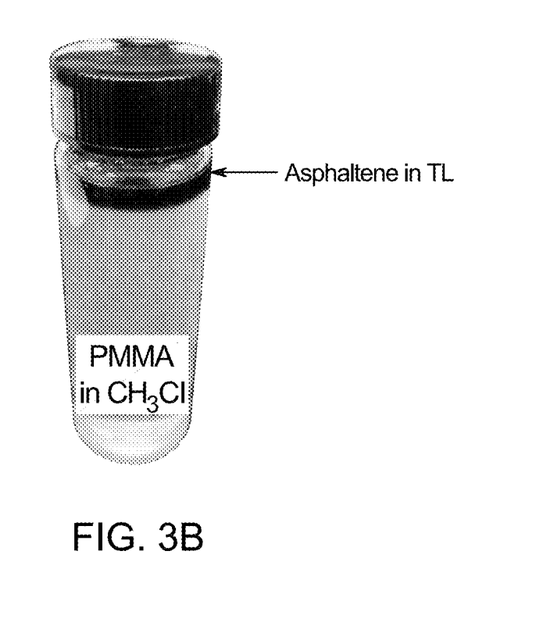
FIG. 3B is an image showing asphaltene dissolved in toluene, layered on top of a solution of polymethyl methacrylate (PMMA) polymer dissolved in $CHCl_3$, according to certain embodiments.
Figure 3C:
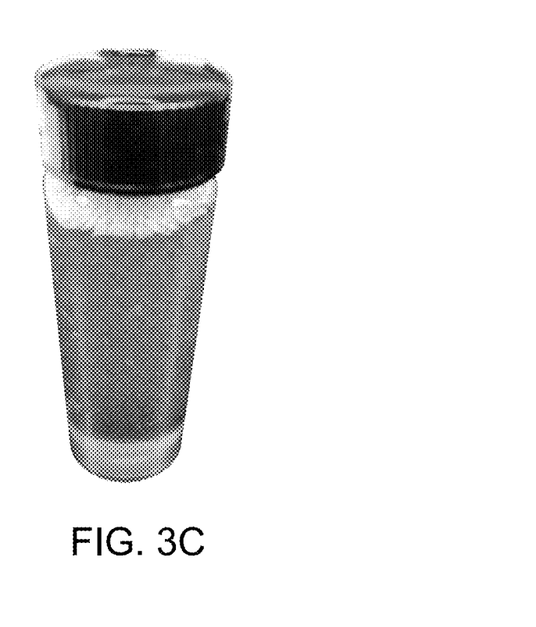
FIG. 3C is an image showing a PMMA-asphaltene solution, according to certain embodiments.
Figure 4A:
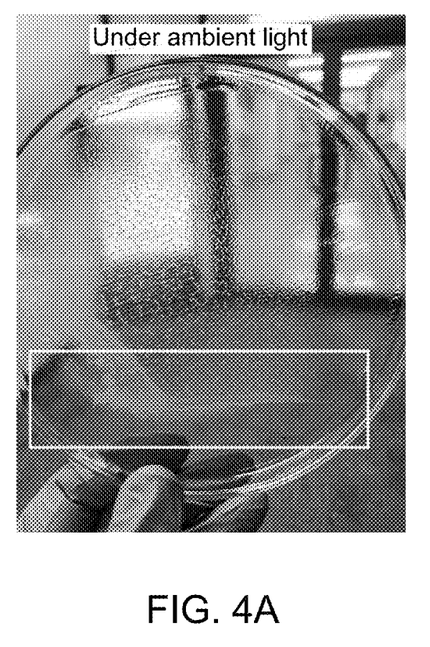
FIG. 4A shows a PMMA thin film deposited on a glass under ambient lighting conditions, according to certain embodiments.
Figure 4B:
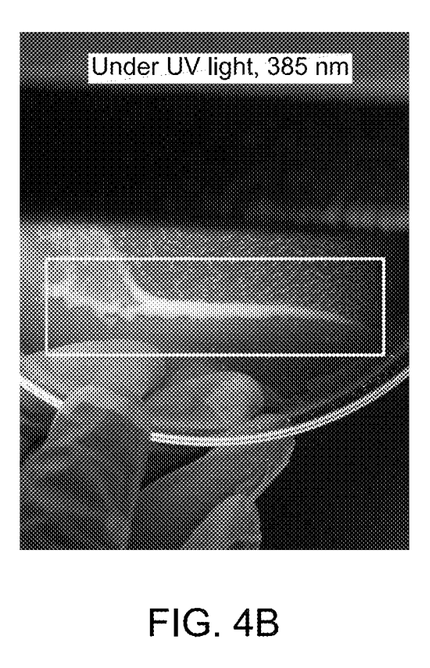
FIG. 4B shows a PMMA thin film deposited on glass under UV light having a wavelength of about 385 nm, according to certain embodiments.
Figure 4C:
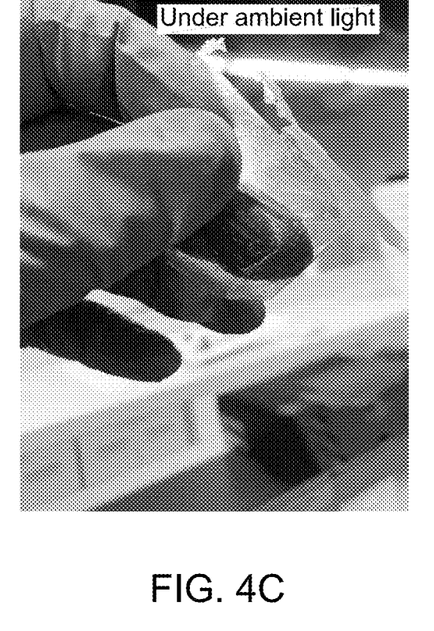
FIG. 4C is an image showing a scratched-off PMMA thin film under ambient lighting conditions, according to certain embodiments.
Figure 4D:
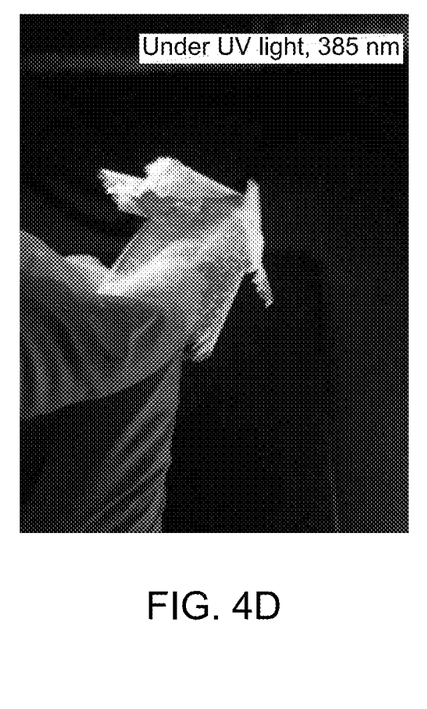
FIG. 4D is an image showing the scratched-off PMMA thin film under UV light having a wavelength of 385 nm, according to certain embodiments.

It may be noted that solid particles of asphaltene itself are non-emissive under light or UV excitation as shown in FIG. 3A. This means that the asphaltene utilized currently in paving roads will not be emissive by itself due to aggregation unless it is solubilized in toluene. Thus, as shown in FIGS. 3B-3C, the asphaltene solution in toluene is mixed with a polymer solution, including polymethyl methacrylate (PMMA) in $CHCl_3$, to make thin films of PMMA later on, avoiding the aggregation phenomena in asphaltene.

Further, upon spreading the PMMA solution on glass and letting the solvent to be evaporated for a few minutes, clear thin films are observed, as shown in FIGS. 4A-4D. The formed thin films deposited on the glass show white emission under UV irradiation of 385 nm, not under ambient light, as differentially observable from FIG. 4B and FIG. 4C. Even upon scratching the PMMA-asphaltene film, it still emits white light under 385 nm UV irradiation. This shows the ability of asphaltene to be a white emitter upon embedding in the polymer matrix.

Figure 5A:
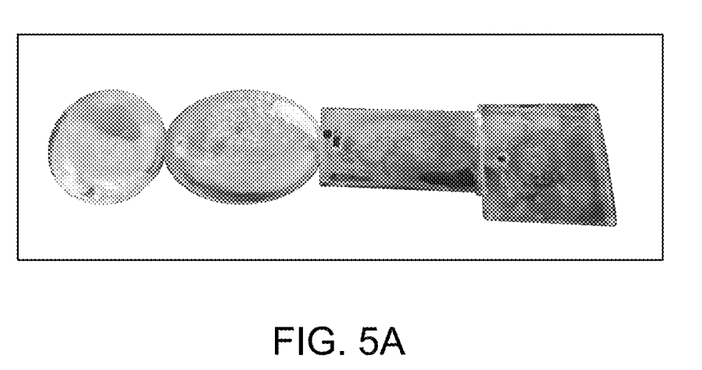
FIG. 5A is an image showing PMMA-asphaltene films disposed on top of a non-emissive blackboard under ambient lighting conditions, according to certain embodiments.
Figure 5B:
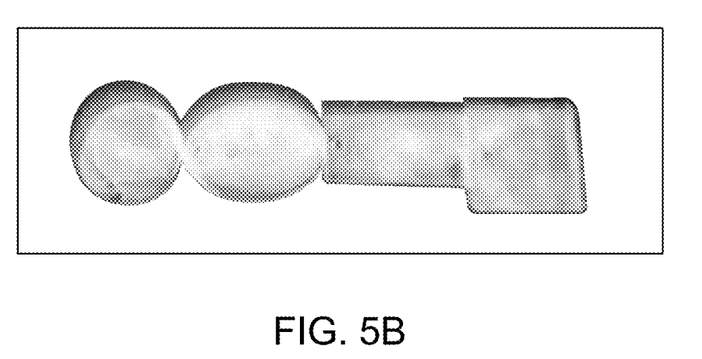
FIG. 5B is an image showing PMMA-asphaltene films disposed on top of the non-emissive blackboard under UV light of 385 nm wavelength, according to certain embodiments.

Referring to FIG. 5A and FIG. 5B, to test the formation of various shapes rather than thin films out of PMMA-asphaltene composite, different forms have been made and put on a non-emissive blackboard, mimicking the road. The board was imaged under ambient light illumination (daylight) and under dark, with UV irradiation at a wavelength of about 385 nm.

Figure 6:
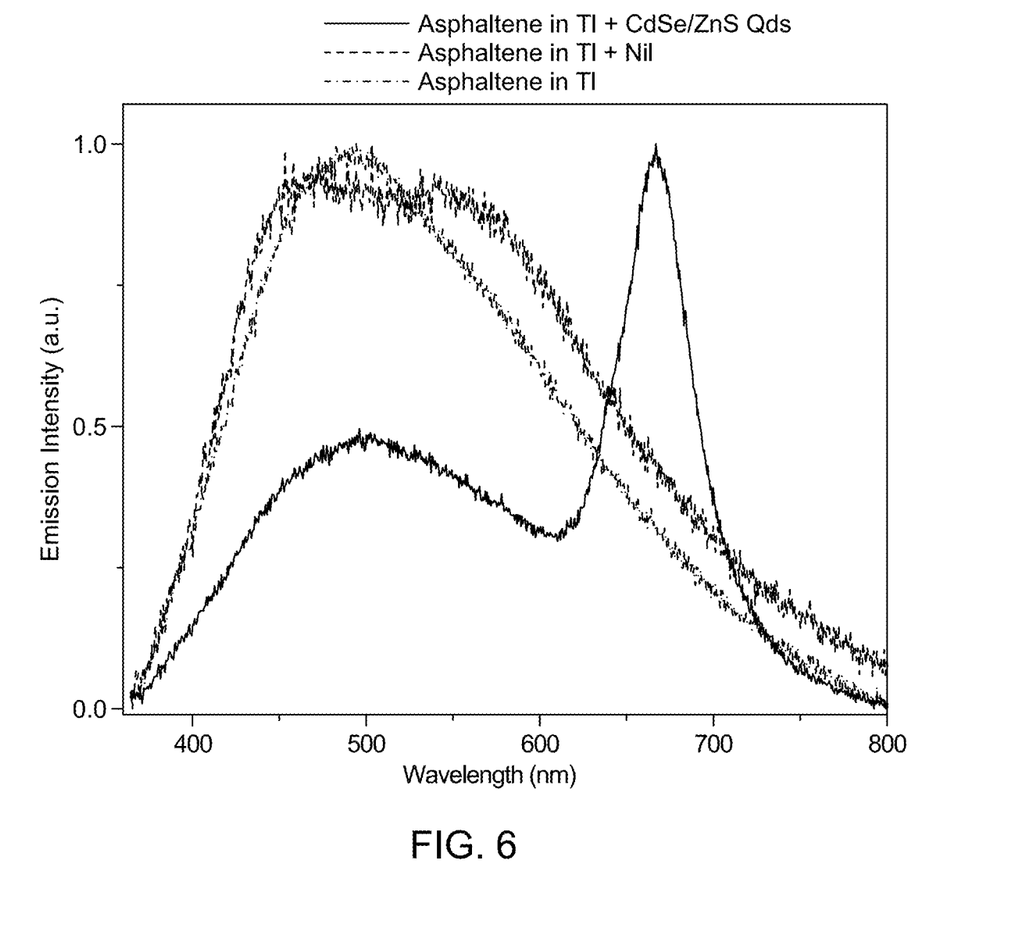
FIG. 6 is a graph showing the state-normalized emission of the asphaltene sample, the state-normalized emission of asphaltene emission upon adding Ni (II), and the steady-state normalized emission of the asphaltene sample upon adding quantum dots particles that modulate the asphaltene properties, according to the certain embodiments.

Further, to manipulate the properties of solvated asphaltene, various additives were added to manipulate the white emission from the asphaltene sample, and the white emission was resistive to most additives except upon adding $CaCl_2$), NiI and CdSe quantum dots (as listed in Table 1). However, the asphaltene emission properties are mainly modulated upon adding Ni (II), in which the emission was broader, as shown in FIG. 6. Also, upon mixing the asphaltene with CdSe/ZnS quantum dots, an intense red emission is overlapped with the one of the asphaltene, illustrating the potential of increasing the white color intensity upon mixing with quantum dots, as shown in FIG. 6.

TABLE 1 properties of asphaltene sample upon manipulation by one or more additives

| Additive | Effect (Yes/No) | Notes about emission changes. |
|---|---|---|
| Water | No | Stable until hundreds of µmls |
| Sodium Dodecyl Sulphate, 1 mM | No | No effect |
| CuBr | No | No effect |
| NaI | No | No effect |
| $CuSO_4$ | No | No effect |
| $GaCl_3$ | No | No effect |
| LiCl | No | No effect |
| CsF | No | No effect |
| $FeCl_3$ | No | No effect |
| $CaCl_2$ | Yes | Emission increase of ca. 9% |
| $K_2SO_4$ | No | No effect |
| NaCl | No | No effect |
| Cetyltrimethylammonium bromide, 1 mM | No | No effect |
| $ZnCl_2$ | No | No effect |
| $Cr_2(NO_3)_2$ | No | No effect |
| NiI | Yes | Emission gets broader but less intense. |
| CdSe/ZnS QDs, 500 ppm | No | Emission gets more red emission at 650 nm. |

To summarize, aspects of the present disclosure provide an efficient and environmentally friendly method of illuminating the pavement using asphaltenes and PMMA. Asphaltene shows strong white emission upon solvation in toluene when irradiated by selective UV irradiation of 385 nm. Asphaltene with PMMA polymer composites was formed in various ways to illuminate roads at night. The present disclosure provides a composite that may illuminate pavements by utilizing the UV emission from multiple sources, such as, but not limited to, headlights of automobiles driving on the pavement. The emission properties of the composite may be enhanced upon adding selective metal cations and more substantially upon mixing with quantum dots.

Numerous modifications and variations of the present disclosure are possible in light of the above teachings. Therefore, it is to be understood that within the scope of the appended claims, the invention may be practiced other than as specifically described herein.

The invention claimed is:
1. A method of illuminating a pavement, comprising:
mixing asphaltenes and a polymer in a solvent to form a solution;
coating the pavement with the solution and evaporating the solvent to form a coated pavement; and
irradiating the coated pavement,
wherein following the irradiating, the asphaltenes emit light thereby illuminating the pavement,
wherein the asphaltenes are homogeneously dispersed in a matrix of the polymer in the coated pavement,
wherein the polymer has a following formula (I),

(I)

wherein $R_1$ and $R_2$ are each independently an optionally substituted alkyl group having 1-20 carbon atoms or an optionally substituted aryl group having 1-20 carbon atoms, and n is 2-10000.

2. The method of claim 1, wherein the asphaltenes comprise carbon, hydrogen, nitrogen, oxygen, sulfur, vanadium, and nickel.

3. The method of claim 1, wherein the asphaltenes are not aggregated in the coated pavement.

4. The method of claim 1, wherein the asphaltenes are sourced from crude oil, bitumen, or coal.

5. The method of claim 1, wherein the asphaltenes have a molecular weight of 200-2000 g/mol.

6. The method of claim 1, wherein the asphaltenes have a concentration of 1-1000 ng/mL in the solution.

7. The method of claim 1, further comprising dissolving the asphaltenes in toluene prior to the mixing.

8. The method of claim 1, further comprising halogenating the asphaltenes with at least one of chlorine, bromine, and iodine prior to the mixing.

9. The method of claim 1, wherein the solvent is at least one of tetrahydrofuran, toluene, cyclohexanone, ethyl acetate, dichloromethane, and chloroform.

10. The method of claim 1, wherein the asphaltenes emit white light having a wavelength of 400-800 nm.

11. The method of claim 1, wherein the polymer is polymethyl methacrylate (PMMA).

12. The method of claim 1, wherein the polymer has a molecular weight of 100-200,000 g/mol.

13. The method of claim 1, wherein at least one of $R_1$ and $R_2$ in the polymer comprises an optionally substituted naphthalene.

14. The method of claim 13, wherein the naphthalene is substituted with at least one of a hydroxyl and a halide.

15. The method of claim 1, wherein the irradiating is from at least one source selected from vehicle headlights, streetlights, and sunlight.

16. The method of claim 1, wherein the irradiating is with light having a wavelength of 310-390 nm.

17. The method of claim 1, wherein the solution further comprises at least one additive selected from water, sodium dodecyl sulphate, CuBr, NaI, $CuSO_4$, $GaCl_3$, LiCl, CsF, $FeCl_3$, $CaCl_2$, $K_2SO_4$, NaCl, cetyltrimethylammonium bromide, $ZnCl_2$, $Cr_2(NO_3)_2$, NiI, and CdSe/ZnS quantum dots.

18. The method of claim 1, wherein the solution further comprises at least one additive selected from $CaCl_2$, NiI, and CdSe/ZnS quantum dots.

19. The method of claim 1, wherein a covalent bond is formed between the asphaltenes and the polymer during the mixing.

20. The method of claim 1, wherein the coating forms a coated pavement comprising:
  a top layer comprising the asphaltenes and the polymer, and
  a bottom layer comprising a solid stone aggregate dispersed in an asphalt matrix,
  wherein the asphalt matrix comprises asphaltene components different from the asphaltenes in the top layer,
  wherein the first layer has a thickness of less than 0.1 times the thickness of the second layer, and
  wherein the asphaltene components in the asphalt matrix are aggregated and do not emit light.

* * * * *